(12) United States Patent
Dam et al.

(10) Patent No.: US 10,240,830 B2
(45) Date of Patent: Mar. 26, 2019

(54) EXPANSION VALVE COMPRISING A STOP ELEMENT

(71) Applicant: DANFOSS A/S, Nordborg (DK)

(72) Inventors: Bjarke Skovgard Dam, Almind (DK); Georg Fosel, Flensburg (DE); Carsten Molhede Thomsen, Vejle (DK); Jens Pawlik, Broager (DK); Louis Sullivan, Indianapolis, IN (US)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 14/902,086

(22) PCT Filed: Jun. 30, 2014

(86) PCT No.: PCT/IB2014/062717
§ 371 (c)(1),
(2) Date: Dec. 30, 2015

(87) PCT Pub. No.: WO2015/001464
PCT Pub. Date: Jan. 8, 2015

(65) Prior Publication Data
US 2016/0195317 A1 Jul. 7, 2016

(30) Foreign Application Priority Data

Jul. 4, 2013 (EP) ..................... 13175064

(51) Int. Cl.
*F25B 41/06* (2006.01)
*F16K 15/02* (2006.01)

(52) U.S. Cl.
CPC .......... *F25B 41/062* (2013.01); *F16K 15/026* (2013.01); *F25B 2500/01* (2013.01);
(Continued)

(58) Field of Classification Search
CPC ........ F16K 15/026; F16K 17/18; F16K 17/19; F16K 17/196; F25B 2500/01;
(Continued)

(56) References Cited

U.S. PATENT DOCUMENTS 1,159,214 A * 11/1915 Gueux ................. G05D 7/0106
137/503
2,000,431 A * 5/1935 Aumack ............... F16K 17/196
137/493.4
(Continued)

FOREIGN PATENT DOCUMENTS

CN 102878733 A 1/2013
CN 102878734 A 1/2013
(Continued)

OTHER PUBLICATIONS

International Search Report for PCT Serial No. PCT/IB2014/062717 dated Oct. 2, 2014.
(Continued)

*Primary Examiner* — William McCalister
(74) *Attorney, Agent, or Firm* — McCormick, Paulding & Huber LLP

(57) ABSTRACT

An expansion valve (1) for a vapor compression system, the valve (1) comprising a first valve part (5) having an outlet orifice (7) and a piston (8) movable inside the outlet orifice (7) in response to a differential pressure across the expansion valve (1), controlling a fluid flow through the valve (1). The piston (8) comprises a stop element (9) at an outlet end (8b) of the piston (8) and mechanical forcing means (10) to force the piston (8) towards a position in which the stop element (9) is brought into abutment with a valve seat (12) of the first valve part (5). A differential pressure below a predefined threshold value causes the stop element (9) of the piston (8) to abut the valve seat (12) of the first valve part (5),
(Continued)

preventing fluid flow through the first valve part (5), via the forward fluid passage.

7 Claims, 10 Drawing Sheets

(52) U.S. Cl.
CPC ....... *F25B 2500/26* (2013.01); *F25B 2500/27* (2013.01); *Y10T 137/7775* (2015.04)

(58) Field of Classification Search
CPC .............. F25B 2500/26; F25B 2500/27; F25B 41/062; Y10T 137/7774; Y10T 137/7775; Y10T 137/7776; Y10T 137/7932
USPC .................. 137/542, 493.3, 493.4, 493.5
See application file for complete search history.

(56) References Cited

U.S. PATENT DOCUMENTS

| | | | | |
|---|---|---|---|---|
| 2,191,636 A * | 2/1940 | Walker | ............... | F01P 11/02 137/493.4 |
| 3,322,142 A | 5/1967 | Baumann | | |
| 3,425,444 A | 2/1969 | Jones | | |
| 3,912,630 A * | 10/1975 | Reighard | ............... | B29B 13/022 210/130 |
| 3,918,481 A * | 11/1975 | Doe | ............... | F16K 17/30 137/504 |
| 3,939,866 A * | 2/1976 | Pignatelli | ............... | B60K 15/04 137/493.4 |
| 3,971,406 A * | 7/1976 | Inada | ............... | B60K 15/03519 137/493.4 |
| 4,075,294 A * | 2/1978 | Saito | ............... | F02M 7/093 137/504 |
| 4,129,144 A * | 12/1978 | Andersson | ............... | F16K 15/026 137/516.29 |
| 4,153,073 A * | 5/1979 | Deters | ............... | B67D 7/048 137/493.4 |
| 4,341,090 A * | 7/1982 | Ramakrishnan | ............... | F25B 41/06 137/493.9 |
| 4,813,452 A * | 3/1989 | Smith | ............... | F16K 1/12 137/514.7 |
| 4,971,093 A * | 11/1990 | Andersson | ............... | F16K 15/026 137/541 |
| 5,002,089 A * | 3/1991 | Reedy | ............... | F25B 41/06 137/493.8 |
| 5,025,640 A * | 6/1991 | Drucker | ............... | F25B 41/06 137/493.8 |
| 5,029,454 A * | 7/1991 | Eisberg | ............... | F25B 41/06 137/493.8 |
| 5,038,579 A | 8/1991 | Drucker | | |
| 5,052,192 A | 10/1991 | Drucker | | |
| 5,282,492 A * | 2/1994 | Angeli | ............... | F16K 17/196 137/493.4 |
| 5,901,750 A | 5/1999 | Kozinski | | |
| 5,971,016 A * | 10/1999 | Wass | ............... | F16K 17/0413 137/541 |
| 6,289,924 B1 * | 9/2001 | Kozinski | ............... | F25B 41/062 137/497 |
| 6,305,414 B1 | 10/2001 | Kozinski | | |
| 6,581,633 B2 * | 6/2003 | Andersson | ............... | F16K 15/026 137/533.21 |
| 6,755,629 B2 * | 6/2004 | Utsumi | ............... | F02M 59/462 137/542 |
| 6,877,525 B2 * | 4/2005 | Fischer | ............... | F16K 1/12 137/538 |
| 6,994,108 B2 * | 2/2006 | Roth | ............... | F02M 55/001 137/541 |
| 8,561,638 B2 * | 10/2013 | Yamaguchi | ............... | B60K 15/03519 137/493.6 |
| 8,955,773 B2 * | 2/2015 | Watson | ............... | F22G 5/123 137/542 |
| 9,097,356 B2 * | 8/2015 | Yamaguchi | ............... | F02M 37/20 |
| 2013/0098071 A1 | 4/2013 | Means | | |
| 2015/0276286 A1 | 10/2015 | Jin et al. | | |

FOREIGN PATENT DOCUMENTS

| | | |
|---|---|---|
| CN | 202914833 U | 5/2013 |
| CN | 203216168 U | 9/2013 |
| CN | 203274379 U | 11/2013 |
| CN | 203363190 U | 12/2013 |
| CN | 103216980 B | 2/2015 |
| FR | 2 661 977 A1 | 11/1991 |
| WO | 2012/072076 A2 | 6/2012 |
| WO | 2012/119602 A1 | 9/2012 |
| WO | 2014/063558 A1 | 5/2014 |
| WO | 2014/063559 A1 | 5/2014 |
| WO | 2014/173080 A1 | 10/2014 |

OTHER PUBLICATIONS

International Search Report for Serial No. PCT/IB2014/062719 dated May 9, 2014.
International Search Report for Serial No. PCT/IB2014/062718 dated Apr. 9, 2014.

* cited by examiner

EXPANSION VALVE COMPRISING A STOP ELEMENT

CROSS-REFERENCE TO RELATED APPLICATIONS

This application is entitled to the benefit of and incorporates by reference subject matter disclosed in the International Patent Application No. PCT/IB2014/062717 filed on Jun. 30, 2014 and European Patent Application No. 13175064 filed on Jul. 4, 2013.

TECHNICAL FIELD

The present invention relates to an expansion valve for a vapour compression system, such as a refrigeration system, an air condition system or a heat pump. The expansion valve of the invention is capable of delaying an equilibration towards zero of differential pressure across the valve during an off period of the compressor of the vapour compression system.

BACKGROUND

Reduction of energy consumption of vapour compression systems, such as refrigeration systems, air condition systems or heat pumps, is desired. Various efforts have been made to improve the components of vapour compression systems to reduce the energy consumption of the individual components, and of the vapour compression systems as such.

Furthermore, the expansion valve of a vapour compression system may advantageously be operable to control the amount of refrigerant being supplied to the evaporator to utilise the available cooling or heating capacity of the vapour compression system to the greatest possible extent.

U.S. Pat. No. 5,002,089 discloses a variable area refrigerant expansion device for heating mode of a heat pump. The expansion device comprises an elongated member extending into a metering port. The elongated member and the metering port cooperate to define a flow metering passage between the elongated member and the metering port. The elongated member is configured to vary the cross-sectional area of the flow metering passage in relation to the position of the elongated member to the metering port. A spring is mounted in a bellows which is connected to atmospheric pressure. The spring and the atmospheric pressure acting on the bellows in combination push the elongated member in a first direction. When the system is shut off a positive pressure inside the system results in a force acting on the bellows which exceeds the combined force exerted on the bellows by the spring and atmospheric pressure. As a result, this force causes the elongated member to be biased in a second direction, opposite to the first direction, and moving an enlarged head of the elongated member into sealing engagement with a boss. The positive pressure must be sufficiently high to overcome the force exerted on the bellows by the spring and the atmospheric pressure.

FR 2 661 977 discloses an expansion device comprising a movable piston comprising a metering port. The piston is movable inside a housing relative to an elongated member which is fixed relative to the housing, and which has a conical shape. Thereby the metering port and the elongated member cooperate to define a metering passage. A stop element is mounted on an end part of the elongated member. A spring is mounted inside the housing and forces the movable piston in a direction towards the stop element. A seal is required between the movable piston and the inner wall of the housing in order to provide a tight valve. This has the consequence that a certain minimum force must be applied to initiate movements of the piston, in order to overcome the friction force between the piston and the wall of the housing. Thereby it is difficult to move the piston in a precise manner, and it is not possible to adjust the flow through the valve in a precise manner.

U.S. Pat. No. 5,052,192, U.S. Pat. No. 5,038,579 and U.S. Pat. No. 4,341,090 all disclose expansion valves in which one or two piston(s) is/are mounted movably inside a housing, and relative to an elongated member, which is fixedly mounted inside the housing, similar to the valve disclosed in FR 2 661 977.

SUMMARY

An object of embodiments of the invention may be to provide an expansion valve in which an equilibration towards zero of a differential pressure across the expansion valve can be delayed or eliminated during an off period of a compressor forming part of a vapour compression system where the expansion valve is arranged.

During an off period of the compressor forming part of the vapour compression system where the valve is arranged, the refrigerant is maintained at each side of the valve by the stop. If a stop element is not provided, all refrigerant displaces to the coldest part in the system, and the differential pressure decreases quickly towards zero. At compressor start, the compressor needs to displace the refrigerant from low pressure side of the valve to high pressure side of the valve, before the refrigerant in the system is balanced and can cool down the ambient again. The stop element keeps the refrigerant in place.

Even when a stop element is provided, during a period of time the differential pressure will decrease, because a liquid part of the refrigerant will continue to evaporate, because of temperature difference between ambient temperature and temperature of refrigerant in the system, until a thermodynamic equilibrium is reached, and the refrigerant pressure in the system will be at the saturation pressure level corresponding to the ambient temperature. The period of time for achieving equilibrium depends on the mass of liquid evaporating in the separate sections of the system.

Maintaining the refrigerant in place, by providing a stop element, results in differential pressure across the valve being maintained for a longer period of time, although differential pressure is decreasing because of evaporation of the liquid part of the refrigerant, and results in the period of time being longer for a thermodynamic equilibrium to be reached. Differential pressure decreasing to zero may not be reached during an off period of the compressor, if an off period of the compressor, before the compressor is started again after the off period, is a limited period of time.

As example, if during operation of the compressor a differential pressure across the valve is 10 bar, after an off period of the compressor of, as example, 24 minutes, a differential pressure across the valve may be 3 bar for a valve according to the invention being provided with the stop element, compared to a differential pressure across the valve being zero bar for a valve not being provided with a stop element.

A further object of embodiments of the invention may be to provide an expansion valve for a vapour compression system, the expansion valve allowing an energy consumption of the vapour compression system to be minimised.

The invention provides an expansion valve for a vapour compression system, the valve comprising:

a first valve part having an outlet orifice in relation to an intended fluid flow direction through the first valve part, said outlet orifice providing a forward fluid passage through the first valve part, and a valve seat at an outlet of the outlet orifice, a piston having an inlet end and an outlet end in relation to an intended fluid flow direction through the first valve part, wherein the piston is movable inside the outlet orifice in response to a differential pressure across the expansion valve, controlling a fluid flow through the valve, via the forward fluid passage through the first valve part, and the piston comprising a stop element at the outlet end of the piston and mechanical forcing means arranged to force the piston towards a position in which the stop element is brought into abutment with the valve seat of the first valve part, wherein a differential pressure below a predefined threshold value causes the stop element of the piston to abut the valve seat of the first valve part, preventing fluid flow through the first valve part, via the forward fluid passage.

In the present context the term 'vapour compression system' should be interpreted to mean any system in which a flow of fluid medium, such as refrigerant, circulates and is alternatingly compressed and expanded, providing either refrigeration or heating of a volume. The vapour compression system may be a refrigeration system, an air condition system, a heat pump, etc. The vapour compression system comprises a compressor, a heat rejecting heat exchanger, as example in the form of a condenser or a gas cooler, an expansion valve, and an evaporator, along a refrigerant path.

The expansion valve comprises a first valve part. The first valve part has an outlet orifice in relation to an intended fluid flow direction through the first valve part. The intended fluid flow direction is a direction that fluid normally flows in when passing through the expansion valve. The intended fluid flow direction may advantageously be the flow direction through the expansion valve during normal operation of the vapour compression system, and fluid flowing through the expansion valve is expanded when flowing in the intended fluid flow direction.

Fluid flowing through the first valve part leaves the first valve part via the outlet orifice when flowing in the intended fluid flow direction.

The outlet orifice provides a forward fluid passage through the first valve part. In the present context, the term 'forward' means a flow direction corresponding to the intended fluid flow direction.

The first valve part further has a valve seat at an outlet of the outlet orifice. The function of the valve seat will be described in further detail below.

The expansion valve further comprises a piston having an inlet end and an outlet end in relation to the intended fluid flow direction through the first valve part. In the present context the term 'piston' means an elongated member movable inside the expansion valve. The inlet end of the piston is at a part of the expansion valve where fluid enters the expansion valve when flowing in the intended fluid flow direction, and the outlet end of the piston is at a part of the expansion valve where fluid leaves the expansion valve when flowing in the intended fluid flow direction.

The piston is movable inside the outlet orifice in response to a differential pressure across the expansion valve. In the present context the term 'differential pressure' means a pressure difference between a pressure level at an inlet side of the expansion valve and a pressure level at an outlet side of the expansion valve. When the pressure difference changes, the position of the piston inside the outlet orifice also changes, and the position of the piston inside the orifice is determined by the differential pressure across the expansion valve. The position of the piston inside the outlet orifice determines a fluid flow through the outlet orifice, and through the forward fluid passage through the first valve part. The fluid flow through the valve, via the forward fluid passage through the first valve part, is controlled in accordance with the differential pressure across the expansion valve.

It is an advantage that the piston, i.e. the elongated member, is movable in response to the differential pressure across the expansion valve, instead of the first valve part being movable and the piston being fixed, because thereby the movable part is not abutting the inner wall of the valve housing. Accordingly, there is no friction between the movable part and the fixed parts, and no friction force needs to be overcome in order to move the movable part. This allows the relative position between the piston and the outlet orifice, and thereby the fluid flow through the valve, to be controlled in a precise manner.

The piston comprises a stop element at the outlet end of the piston. Mechanical forcing means is arranged to force the piston towards a position in which the stop element is brought into abutment with the valve seat of the first valve part. When the stop element abuts the valve seat, a fluid flow through the outlet orifice is prevented, and a forward fluid flow through the expansion valve is prevented, and the expansion valve is closed. In order to open the expansion valve, the differential pressure must work against the force applied by the forcing means.

A differential pressure below a predefined threshold value causes the stop element of the piston to abut the valve seat of the first valve part, preventing fluid flow through the first valve part, via the forward fluid passage. The predefined threshold value is a differential pressure applying a force to the piston. The force applied to the piston exactly balances the force applied by the forcing means. At higher differential pressures, the force applied to the piston by the differential pressure exceeds the force applied to the piston by the forcing means. The resulting force on the piston will cause the piston to be moved so that the stop element is moved out of abutment with the valve seat. Similarly, at lower differential pressures, the force applied to the piston by the forcing means exceeds the force applied to the piston by the differential pressure. The resulting force on the piston will push the stop element into abutment with the valve seat.

When the expansion valve of the invention is arranged in a vapour compression system, the expansion valve expands refrigerant and controls the refrigerant supply to the evaporator. The expansion valve expanding refrigerant and controlling the refrigerant supply to the evaporator is done more or less automatically in accordance with the differential pressure across the expansion valve, as described above. If the compressor is switched off, the differential pressure across the expansion valve will immediately start decreasing, because the compressor no longer compresses refrigerant in the suction line, while the expansion valve continues to supply refrigerant to the evaporator. When the differential pressure across the expansion valve reaches the predefined threshold value, the stop element is brought into abutment with the valve seat of the first valve part and closing the valve, as described above. The consequence is that the refrigerant charge is kept in place, and decrease of the differential pressure across the expansion valve is delayed and is not decreasing below a saturation pressure level corresponding to the ambient temperature. The differential pressure across the expansion valve is maintained substantially at the saturation pressure level and above zero for a prolonged period of time compared to expansion valves not having a stop element, and equilibration towards zero of the differential pressure across the expansion valve is delayed.

When the compressor is started again at a later point in time, the differential pressure across the expansion valve is at a relatively high level. Spending energy on establishing a required differential pressure across the expansion valve each time the compressor is switched from an off position to an on position is not necessary. The total energy consumption of the vapour compression system can be minimised.

The mechanical forcing means forcing the piston towards a position in which the stop element is brought into abutment with the valve seat is an advantage, because the stop element is brought reliably and quickly into abutment with the valve seat when the compressor is switched off.

The piston may have a substantially cylindrical outer surface, preferably a circular cylindrical outer surface. In the present context the term 'cylindrical outer surface' means that the piston has a cross-section which does not vary along a longitudinal direction of the piston, at least in a part of the piston which is in the outlet orifice during normal operation of the expansion valve. The cross-section may have any suitable shape. In the case that the cross-section is circular, the surface is referred to as a 'circular cylindrical outer surface'. According to this embodiment, a cross-sectional flow area defined between the outer surface of the piston and an inner surface of the outlet orifice remains substantially constant when the piston moves inside the outlet orifice.

As an alternative, a cross-sectional flow area of the outlet orifice between a circumference at an inner surface of the outlet orifice and a circumference at an outer surface of the piston may vary as a function of the position of the piston relative to the outlet orifice. According to this embodiment, the cross-sectional flow area of the outlet orifice, and the size of the opening which fluid can flow through in the first valve part, varies in response to variations in the differential pressure across the expansion valve. A mass flow through the expansion valve also varies in response to variations in the differential pressure across the expansion valve.

The performance of vapour compression systems, such as residential air conditioning units and heat pump units, must fulfil certain requirements to ensure that their energy consumption is kept at an acceptable level. Vapour compression systems are subjected to standardized tests which measure the performance of the vapour compression system under standard conditions. These tests are sometimes referred to as SEER tests (seasonal energy efficient ratio). For units having a single-speed compressor and a fixed-speed indoor fan, two required test conditions exist in the cooling mode, referred to as the A test and the B test, and two optional tests, referred to as the C test and the D test, which need to be performed to evaluate the energy efficiency of the unit.

The purpose of the A test is to measure the nominal cooling capacity of the unit and the energy consumed during operation. The temperature corresponds to a hot climate condition (dry bulb temperatures: 35° C. at the outdoor and 26.7° C. at the indoor), and the ability to deliver cooling under these demanding conditions is monitored. Under conditions corresponding to a hot climate condition (dry bulb temperatures: 35° C. at the outdoor and 26.7° C. at the indoor), the differential pressure across the expansion valve is expected to be high.

The B test corresponds to a more averaged seasonal temperature (dry bulb temperatures: 27.8° C. at the outdoor and 26.7° C. at the indoor). Conditions corresponding to a more averaged seasonal temperature (dry bulb temperatures: 27.8° C. at the outdoor and 26.7° C. at the indoor) are more typically occurring than the conditions applied during the A test, and the result of the B test plays a more important part when the overall SEER rating is calculated for the unit. The unit performing in an energy efficient manner during the B test is important.

Under conditions corresponding to a more averaged seasonal temperature (dry bulb temperatures: 27.8° C. at the outdoor and 26.7° C. at the indoor), the differential pressure across the expansion valve is expected to be lower than under the conditions prevailing during the A test.

The varying cross-sectional flow area between a circumference at the outer surface of the piston and a circumference at the inner surface of the outlet orifice, in response to variations in the differential pressure across the expansion valve, ensures that the refrigerant flow through the expansion valve is automatically adjusted to meet the energy efficiency requirements under the conditions of the A test and the B test, respectively. Improvements of the overall performance of the vapour compression system is obtained.

To assess the cyclic performance of the unit, the two optional tests, the C test and the D test, may be performed. Basically, the ability of the unit to provide cooling after compressor start-up (D test) effectively is examined and the efficiency is related to the result recorded in the C test. The dry bulb temperatures at the outdoor and the indoor for these tests are the same as for the B test, but the humidity ratio of the indoor air needs to be sufficiently low to prevent that water condensates on the evaporator in the C and D tests.

The stop element of the expansion valve of the invention allows a vapour compression system having the expansion valve arranged therein to perform well in the D test.

A varying cross-sectional flow area between a circumference at the outer surface of the piston and a circumference at the inner surface of the outlet orifice may be obtained in the case that the piston has a substantially conical outer surface, preferably a circular conical outer surface. In the present context, the term 'conical outer surface' means that the piston has a cross-sectional area which varies along a longitudinal direction of the piston, while the shape of the cross section remains substantially the same along the longitudinal direction. The cross section may have any suitable shape. In the case that the cross section has a circular shape, the surface is referred to as a 'circular conical outer surface'. In this case the piston has the shape of a normal cone or a frustum of a cone.

As an alternative, the piston may have different cylindrical shapes stepwise along a longitudinal extension of the piston, the piston defining a first cross sectional area along a first longitudinal extension and a second cross sectional area along a second longitudinal extension. According to this embodiment, at least two distinct cross-sectional flow areas between the outer surface of the piston and the inner surface of the outlet orifice are defined. The two distinct cross-sectional flow areas may advantageously correspond to a cross-sectional flow area being appropriate under the A test conditions and the B test conditions, respectively, as described above. It is efficiently ensured that the vapour compression system performs well in these two situations, and the SEER rating of the vapour compression system may be improved.

A cross-sectional flow area of the outlet orifice between a circumference at an inner surface of the outlet orifice and a circumference at an outer surface of the piston may decrease, when the piston is moved in a direction which causes the stop element of the piston to move away from the valve seat of the first valve part. According to this embodiment, the cross-sectional flow area is large at low differential pressures, corresponding to the B test conditions, and smaller at higher differential pressures, corresponding to the A test conditions. A refrigerant flow, a mass flow of refrigerant, through the expansion valve during the B test conditions is lower, or at the least equal to, refrigerant flow during the A test conditions.

A cross-sectional flow area of the outlet orifice between a circumference at an inner surface of the orifice and a circumference at an outer surface of the piston may increase, when the piston is moved further in the direction which causes the stop element of the piston to move away from the valve seat of the first valve part. According to this embodiment, the cross-sectional flow area, and the refrigerant flow through the expansion valve, is increased when the differential pressure is very high.

In some vapour compression systems the evaporator is a so-called micro channel heat exchanger, being a heat exchanger in which the refrigerant passes through a plurality of parallel micro channels. The expansion valve must open quickly when the compressor is switched on after an off cycle. If the expansion valve opens too slowly, the refrigerant supply to the evaporator is too small causing a significant increase in differential pressure across the expansion valve, and introducing undesirable transient effects. However, according to the embodiment, the increase in differential pressure causes the piston to be moved further in the direction which causes the stop element of the piston to move away from the valve seat of the first valve part, and the cross-sectional flow area of the outlet orifice between a circumference at an inner surface of the orifice and a circumference at an outer surface of the piston increases. The fluid flow through the expansion valve is increased, causing a decrease in differential pressure across the expansion valve and removal of the undesired transient effects. Accordingly, this embodiment is very suitable in vapour compression systems comprising a micro channel heat exchanger.

Micro channel heat exchangers are heat exchangers in which (at least one) fluid flows in channels with small hydraulic cross-sectional area. Fluid flow in channels of small hydraulic cross-sectional area will predominantly be laminar in character. The correlation results in an increased heat transfer coefficient when channel cross-sectional area decreases. For laminar flow in channels with small cross-sectional area, the heat transfer coefficient scales inversely with channel cross-sectional area, making micro channels desirable. Refrigerant viscosity determines the minimum practical channel cross-sectional area.

The first valve part may also have an inlet orifice in relation to an intended fluid flow direction through the first valve part, said inlet orifice providing a rearward fluid passage through the first valve part. According to this embodiment, fluid flowing through the expansion valve enters the first valve part via the inlet orifice and leaves the first valve part via the outlet orifice.

A cross-sectional flow area of the inlet orifice between a circumference at an inner surface of the orifice and a circumference at an outer surface of the piston may be constant as a function of the position of the piston relative to the inlet orifice. If the cross-sectional flow area of the outlet orifice varies in response to the position of the piston, the fluid flow through the valve will be limited by the cross-sectional flow area of the outlet orifice, rather than by the cross-sectional flow area of the inlet orifice.

The expansion valve may further comprise a valve housing,
wherein the first valve part is movable inside the valve housing,
wherein a first position of the first valve part inside the valve housing allows a forward fluid flow through the expansion valve and prevents a reverse fluid flow through the expansion valve,
wherein a second position of the first valve part inside the valve housing allows a reverse fluid flow through the expansion valve and prevents a forward fluid flow through the expansion valve, and
wherein the stop element is abutting the valve seat and is preventing forward fluid flow through the expansion valve, when the first valve part is in the second position.

According to this embodiment, the expansion valve is a dual flow valve, meaning that components of the valve may be switched between a position in which the components allow a forward fluid flow through valve, and a position in which the components allow a reverse fluid flow through the valve. When the first valve part is in the first position, the valve operates as an expansion valve, allowing a forward fluid flow through the valve, in the manner described above, while expanding the fluid.

When the first valve part is in the second position, a forward fluid flow through the valve is prevented, and instead a reverse fluid flow through the valve is allowed. A forward fluid flow through the valve is prevented because of the stop element abutting the valve seat. The reverse fluid flow may advantageously be substantially unrestricted, and fluid flowing through the valve in the reverse direction is preferably not expanded.

The valve according to this embodiment may advantageously be used in vapour compression systems selectively operated in an air condition mode or in a heat pump mode. In vapour compression systems selectively operated in an air condition mode or in a heat pump mode, ability to reverse the flow direction of the fluid flow of the system is necessary. The valve must be able to provide the required expansion of refrigerant in one mode, while allowing an unrestricted fluid flow to pass in the other mode. The valve being able to provide the required expansion of refrigerant in one mode, while allowing an unrestricted fluid flow to pass in the other mode is obtained by the piston being movable inside a first valve part, which is in turn movable inside a valve housing.

The mechanical forcing means may comprise a compressible spring, said compressible spring being positioned between the inlet end of the piston and a spring contact surface of the first valve part. According to this embodiment the compressible spring pushes the piston towards the position where the stop element abuts the valve seat. As an alternative, other kinds of mechanical forcing means, such as a resilient member, a torsion spring, etc. may be used.

The stop element may be an elastomeric element fixed to the outlet end of the piston, and may be forming an enlarged head of the piston, said elastomeric element having a cross-sectional area being larger than the cross-sectional area of the valve seat, and said elastomeric element having an outer circumference being larger than an inner circumference of the valve seat.

BRIEF DESCRIPTION OF THE DRAWINGS

The invention will now be described in further detail with reference to the accompanying drawings in which.

DETAILED DESCRIPTION

Figure 1:
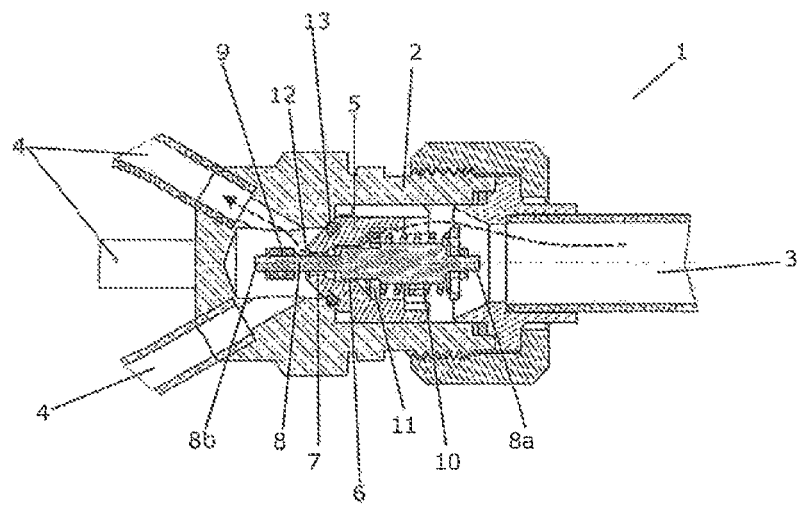
FIGS. 1-3 are cross-sectional views of an expansion valve according to a first embodiment of the invention.
Figure 2:
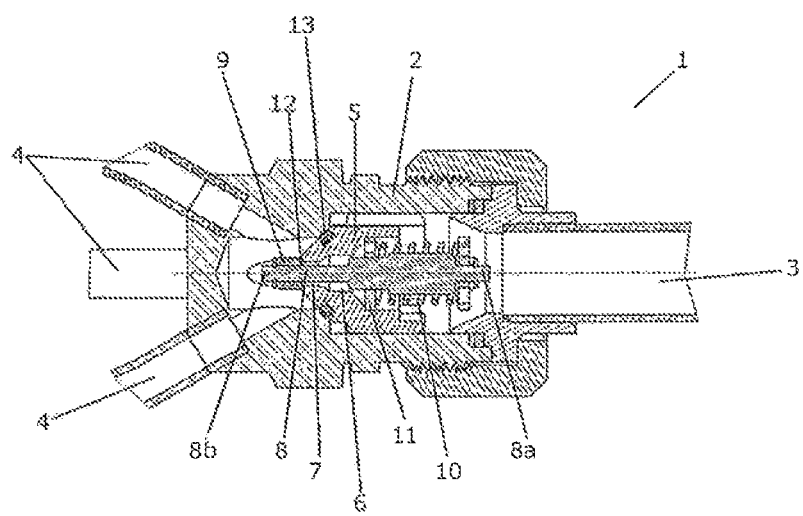
Figure 3:
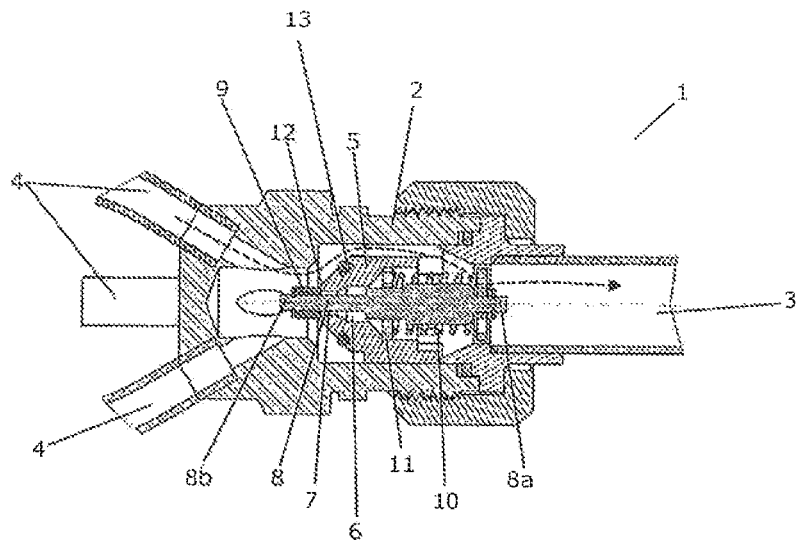

FIGS. 1-3 are cross sectional views of an expansion valve 1 according to a first embodiment of the invention. The expansion valve 1 comprises a valve housing 2, a fluid inlet 3 and four fluid outlets 4, three of which are visible.

A first valve part 5 is movable inside the valve housing 2. The first valve part 5 has an inlet orifice 6 and an outlet orifice 7. A piston 8 is movable inside the first valve part 5. The piston 8 has an inlet end 8a and an outlet end 8b. A stop element 9 is mounted at the outlet end 8b of the piston 8. The stop element 9 may be an elastomeric element.

A compressible spring 10 is mounted inside the first valve part 5 between the inlet end 8a of the piston 8 and a spring contact surface 11. The compressible spring 10 forces the piston 8 in a direction towards a position where the stop element 9 abuts a valve seat 12 at the outlet orifice 7 of the first valve part 5. Furthermore, the piston 8 is movable in response to a differential pressure across the expansion valve 1.

FIG. 1 shows the first valve part 5 and the piston 8 in a position in which a forward fluid flow through the expansion valve 1 is allowed. The first valve part 5 is in abutment with the valve housing 2, via a seal 13, the seal 13 preferably made of Teflon®. The piston 8 is moved in a direction to the left in the Figure, and the stop element 9 is moved out of abutment with the valve seat 12. A fluid flow through the expansion valve 1 from the fluid inlet 3 to the fluid outlets 4, via the inlet orifice 6 and the outlet orifice 7, is allowed, as illustrated by the arrow. As the fluid passes through the outlet orifice 7, the fluid is expanded, the valve 1 operating as an expansion valve when the first valve part 5 it is in the position shown in FIG. 1.

FIG. 2 shows the first valve part 5 and the piston 8 in a closed position, where fluid flow through the valve is prevented. The first valve part 5 is still in abutment with the valve housing 2, preventing a reverse fluid flow through the expansion valve 1. The stop element 9 is in abutment with the valve seat 12 of the first valve part 5, preventing a forward fluid flow through the expansion valve 1.

FIG. 3 shows the first valve part 5 and the piston 8 in a position, in which a reverse fluid flow through the expansion valve 1 is allowed. The first valve part 5 is moved to the right in the Figure, moving the first valve part 5 out of abutment with the valve housing 2. The stop element 9 is in abutment with the valve seat 12, preventing a forward fluid flow through the first valve part 5, as described above. A reverse fluid flow through the expansion valve 1 from the fluid outlets 4 to the fluid inlet 3, via a flow channel defined between the valve housing 2 and the first valve part 5, is allowed, as illustrated by the arrow. The reverse fluid flow through the valve 1 is substantially unrestricted. Accordingly, when a reverse fluid flow through the expansion valve 1 is allowed, the fluid is not expanded when passing through the valve 1.

The expansion valve 1 of FIGS. 1-3 is capable of selectively allowing fluid flow through the valve 1 in a forward direction, as illustrated in FIG. 1, or in a reverse direction, as illustrated in FIG. 3. The expansion valve 1 is suitable for use in a vapour compression system which operates as a combined air condition unit and heat pump unit. In combined air condition units and heat pump units reverse fluid flow through the system is needed to allow heat exchangers of the system to operate as a condenser or as an evaporator, depending on whether the system is operating as an air condition unit or the system is operating as a heat pump unit. It is an advantage that reverse fluid flow through the system can be obtained by the first valve part 5 being movable inside the valve housing 2.

Figure 4:
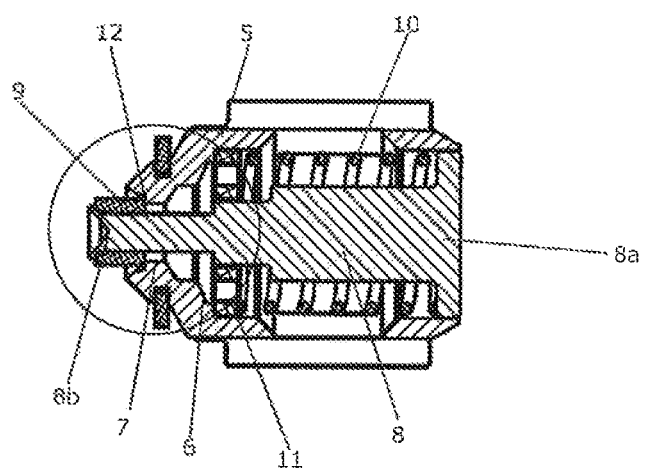
FIGS. 4-6 are cross-sectional views of a first valve part for an expansion valve according to a second embodiment of the invention.
Figure 5:
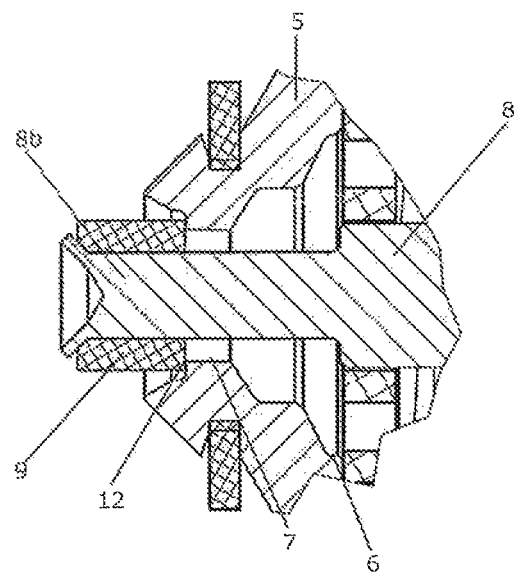
Figure 6:
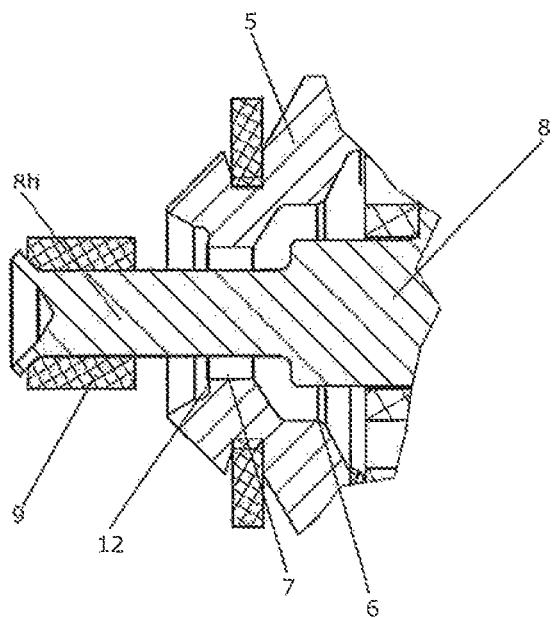

FIGS. 4-6 are cross-sectional views of a first valve part 5 for an expansion valve according to a second embodiment of the invention. FIG. 4 shows the entire first valve part 5. The first valve part 5 comprises an inlet orifice 6 and an outlet orifice 7, defining a forward fluid flow passage through the first valve part 5.

A piston 8 having an inlet end 8a and an outlet end 8b is movable inside the first valve part 5, the piston 8 extending through the inlet orifice 6 and the outlet orifice 7.

A stop element 9 is at the outlet end 8b of the piston 8, e.g. in the form of an elastomeric element. When the stop element 9 is in abutment with a valve seat 12 at the outlet orifice 7 of the first valve part 5, a forward fluid flow through the forward fluid flow passage of the first valve part 5 is prevented. When the stop element 9 is out of abutment with the valve seat 12, a forward fluid flow through the inlet orifice 6 and the outlet orifice 7 is allowed. Accordingly, a forward fluid flow through the first valve part 5 is determined by the position of the piston 8 relative to the outlet orifice 7.

A compressible spring 10 is mounted inside the first valve part 5 between the inlet end 8a of the piston 8 and a spring contact surface 11. The compressible spring 10 forces the piston 8 in a direction towards a position where the stop element 9 abuts a valve seat 12 at the outlet orifice 7 of the first valve part 5. Furthermore, the piston 8 is movable in response to a differential pressure across the expansion valve. The forward fluid flow through the first valve part 5 is determined by the differential pressure across the expansion valve. Since the compressible spring 10 forces the piston 8 in a direction which brings the stop element 9 into abutment with the valve seat 12, the stop element 9 will be brought into abutment with the valve seat 12 at a differential pressure below a predefined threshold value, corresponding to the force applied by the compressible spring 10.

The part of the piston 8 which extends through the inlet orifice 6 and the outlet orifice 7 has a substantially cylindrical shape. A cross-sectional flow area defined between the piston 8 and the outlet orifice 7 remains substantially constant when the position of the piston 8 changes in response to changes in the differential pressure across the expansion valve, when the stop element 9 is out of abutment with the valve seat 12.

FIGS. 5 and 6 show a detail of the first valve part 5 of FIG. 4. In FIG. 5 the stop element 9 abuts the valve seat 12. A forward fluid flow through the first valve part 5 is prevented, i.e. the expansion valve is in a closed position. In the situation illustrated in FIG. 5 the differential pressure across the valve is below the predefined threshold value.

In FIG. 6 the stop element 9 has been moved out of abutment with the valve seat 12. A forward fluid flow through the first valve part 5, via the forward fluid passage defined by the inlet orifice 6 and the outlet orifice 7, is allowed, and the valve is in an open position. In the situation illustrated in FIG. 6 the differential pressure across the valve is above the predefined threshold value. The higher the differential pressure, the further away from the valve seat 12 the stop element 9 will be moved. However, since the shape of the part of the piston 8 which is arranged in the outlet orifice 7 is substantially cylindrical, the movements of the piston 8 inside the outlet orifice 7 in response to the differential pressure will not affect the cross-sectional flow area defined between the piston 8 and the outlet orifice 7, as described above.

The first valve part 5 of FIGS. 4-6 may advantageously be movable inside a valve housing in the manner described above with reference to FIGS. 1-3.

Figure 7:
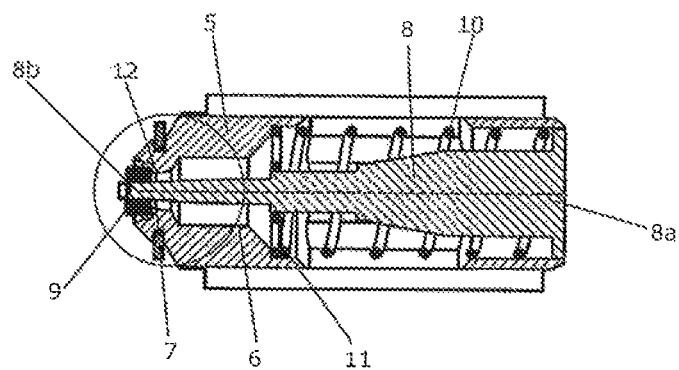
FIGS. 7-10 are cross-sectional views of a first valve part for an expansion valve according to a third embodiment of the invention.

FIGS. 7-10 are cross sectional views of a first valve part 5 for an expansion valve according to a third embodiment of the invention. FIG. 7 shows the entire first valve part 5. The first valve part 5 comprises an inlet orifice 6 and an outlet orifice 7, defining a forward fluid flow passage through the first valve part 5. The first valve part 5 of FIGS. 7-10 is similar to the first valve part 5 of FIGS. 4-6, and it will not be described in detail here.

Figure 8:
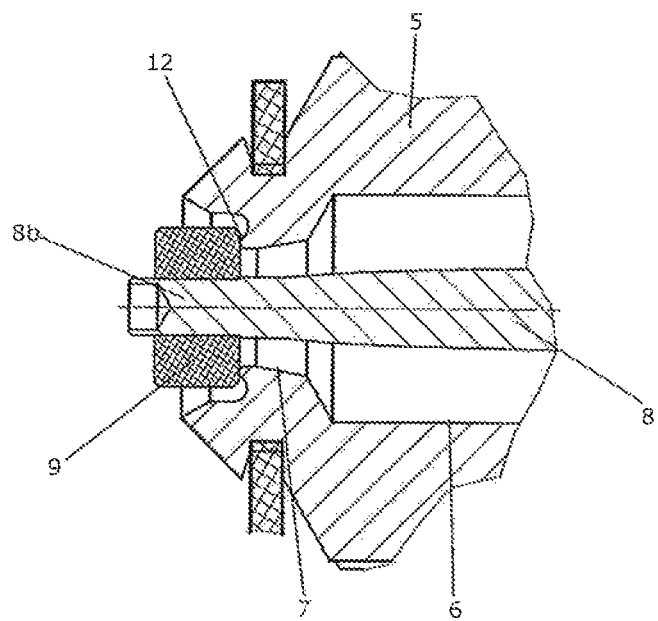
Figure 9:
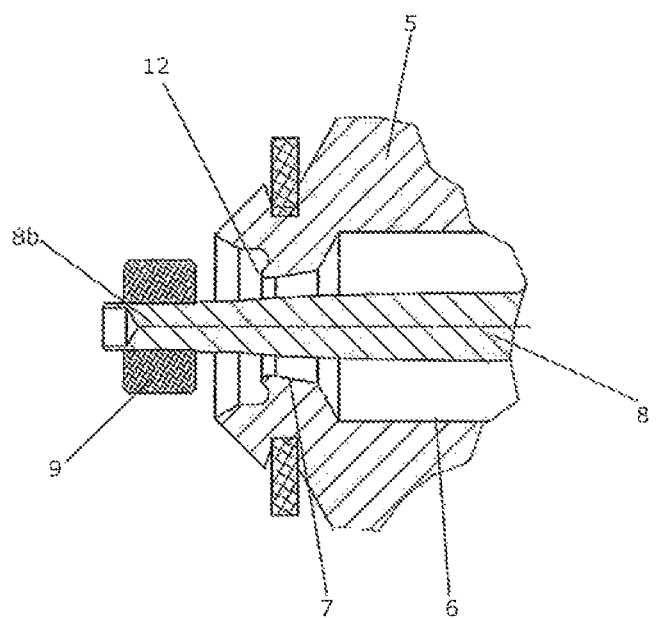

In the embodiment of FIGS. 7-9 the part of the piston 8 which extends through the outlet orifice 7 has a substantially conical shape. A cross-sectional flow area defined between the piston 8 and the outlet orifice 7 varies in response to the position of the piston 8, and in accordance with the differential pressure across the valve. The conical shape of the piston 8 is such that an increase in differential pressure results in a decrease in the cross-sectional flow area defined between the piston 8 and the outlet orifice 7.

Figure 10:
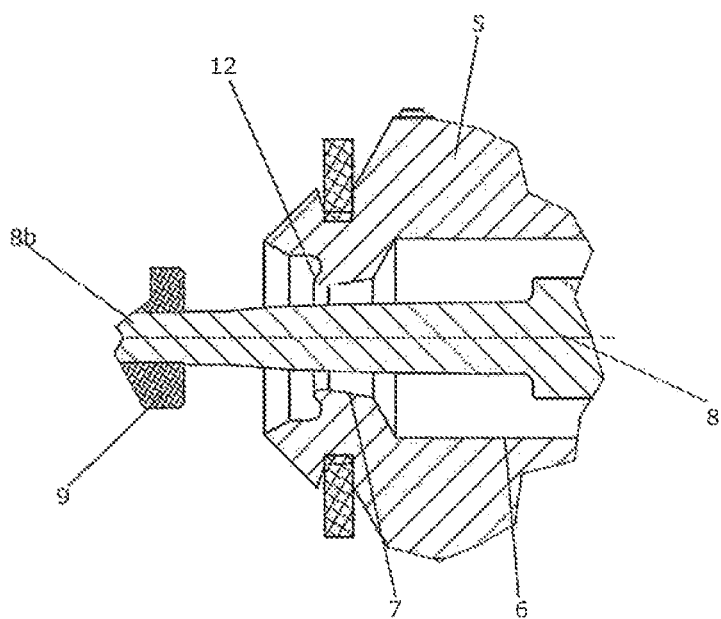

FIGS. 8-10 show a detail of the first valve part 5 of FIG. 7. In FIG. 8 the stop element 9 abuts the valve seat 12. A forward fluid flow through the first valve part 5 is prevented, i.e. the expansion valve is in a closed position. In the situation illustrated in FIG. 8 the differential pressure across the valve is below the predefined threshold value.

In FIG. 9 the stop element 9 has been moved out of abutment with the valve seat 12. A forward fluid flow through the first valve part 5, via the forward fluid passage defined by the inlet orifice 6 and the outlet orifice 7, is allowed, and the valve is in an open position. In the situation illustrated in FIG. 9 the differential pressure across the valve is above the predefined threshold value. However, the differential pressure is relatively close to the predefined threshold value, and the piston 8 has only been moved a small distance away from the position in which the stop element 9 abuts the valve seat 12. The part of the piston 8 which is in the outlet orifice 7 has a relatively small diameter, and a relatively large cross-sectional flow area is defined between the piston 8 and the outlet orifice 7.

In FIG. 10 the piston 8 has been moved further in the direction which moves the stop element 9 away from the valve seat 12. The differential pressure across the valve in the situation illustrated in FIG. 10 is higher than the differential pressure across the valve in the situation illustrated in FIG. 9. Therefore, as compared to the situation illustrated in FIG. 9, the part of the piston 8 which is in the outlet orifice 7 has a larger diameter, and the cross-sectional area defined between the piston 8 and the outlet orifice 7 is smaller.

In the first valve part 5 of FIGS. 7-10 the cross-sectional area defined between the piston 8 and the outlet orifice 7 varies according to the position of the piston 8 relative to the outlet orifice 7, and according to the differential pressure across the valve.

The first valve part 5 of FIGS. 7-10 may advantageously be movable inside a valve housing in the manner described above with reference to FIGS. 1-3.

Figure 11:
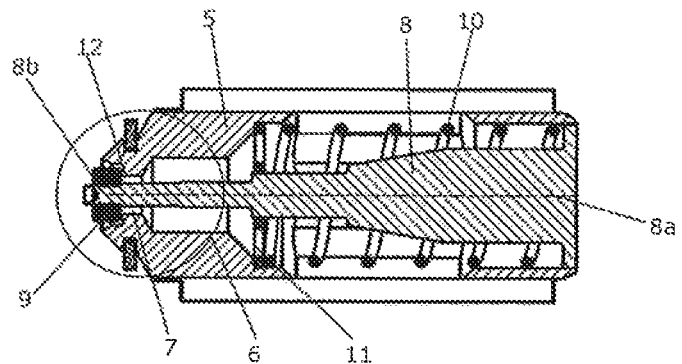
FIGS. 11-14 are cross-sectional views of a first valve part for an expansion valve according to a fourth embodiment of the invention.

FIGS. 11-14 are cross-sectional views of a first valve part 5 for an expansion valve according to a fourth embodiment of the invention. FIG. 11 shows the entire first valve part 5. The first valve part 5 comprises an inlet orifice 6 and an outlet orifice 7, defining a forward fluid flow passage through the first valve part 5. The first valve part 5 of FIGS. 11-14 is similar to the first valve part 5 of FIGS. 4-6, and to the first valve part 5 of FIGS. 7-10, and it will not be described in detail here.

In the embodiment of FIGS. 11-14 the part of the piston 8 which extends through the outlet orifice 7 has different cylindrical shapes stepwise along a longitudinal extension of the piston 8. The cross-sectional area of the piston 8 in a first region is smaller than the cross-sectional area of the piston 8 in a second region, the first region being closer to the outlet end of the piston 8 than the second region. In each of the regions the cross-sectional area of the piston 8 is substantially constant.

When the part of the piston 8 corresponding to the first region is in the outlet orifice 7, a cross-sectional flow area defined between the piston 8 and the outlet orifice 7 is larger than a cross-sectional flow area defined between the piston 8 and the outlet orifice 7 when the part of the piston 8 corresponding to the second region is in the outlet orifice 7.

Figure 12:
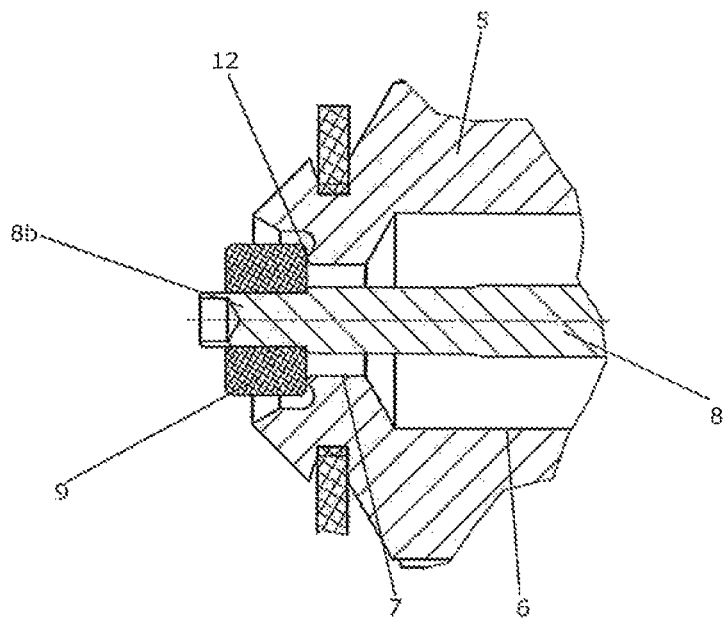
Figure 13:
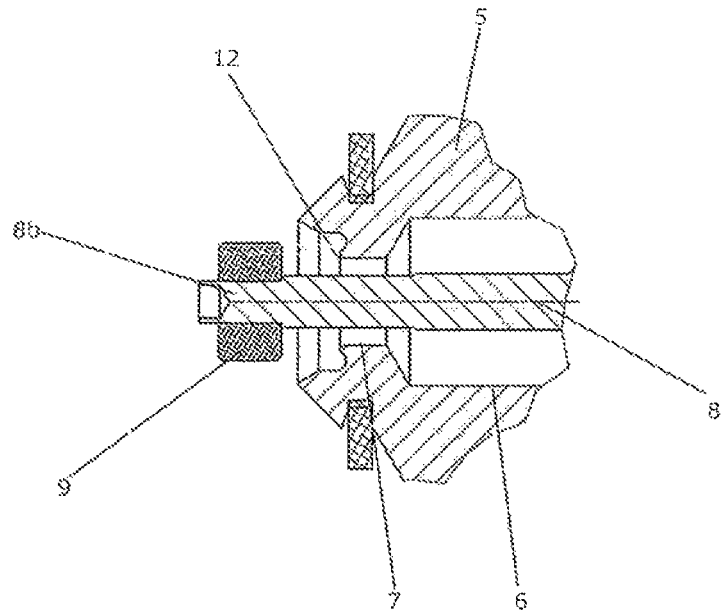
Figure 14:
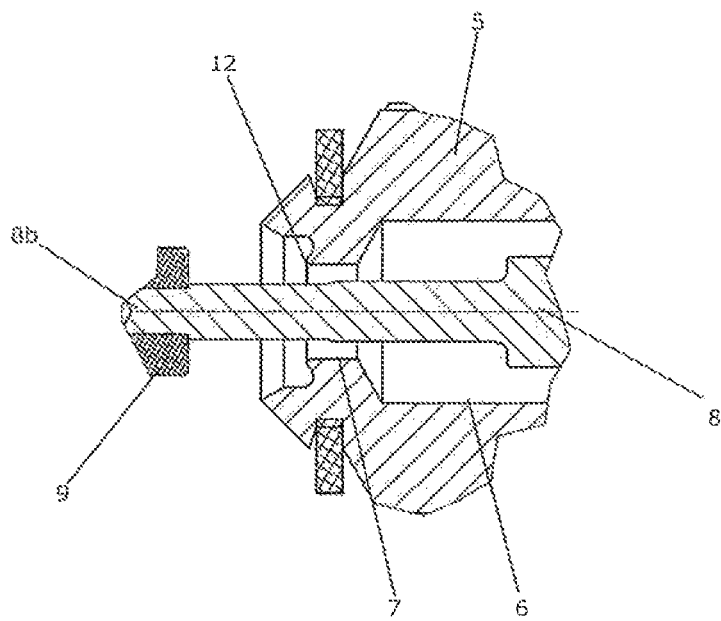

FIGS. 12-14 show a detail of the first valve part 5 of FIG. 11. In FIG. 12 the stop element 9 abuts the valve seat 12. A forward fluid flow through the first valve part 5 is prevented, i.e. the expansion valve is in a closed position. In the situation illustrated in FIG. 12 the differential pressure across the valve is below the predefined threshold value.

In FIG. 13 the stop element 9 has been moved out of abutment with the valve seat 12. A forward fluid flow through the first valve part 5, via the forward fluid passage defined by the inlet orifice 6 and the outlet orifice 7, is allowed, and the valve is in an open position. In the situation illustrated in FIG. 13 the differential pressure across the valve is above the predefined threshold value. However, the differential pressure is relatively close to the predefined threshold value, and the piston 8 has only been moved a small distance away from the position in which the stop element 9 abuts the valve seat 12. The part of the piston 8 which is in the outlet orifice 7 corresponds to the first region, and a relatively large cross-sectional flow area is defined between the piston 8 and the outlet orifice 7.

In FIG. 14 the piston 8 has been moved further in the direction which moves the stop element 9 away from the valve seat 12. The differential pressure across the valve in the situation illustrated in FIG. 14 is higher than the differential pressure across the valve in the situation illustrated in FIG. 13. Therefore, the part of the piston 8 which is in the outlet orifice 7 corresponds to the second region, and the cross-sectional area defined between the piston 8 and the outlet orifice 7 is smaller than is the case in the situation illustrated in FIG. 13.

In the first valve part 5 of FIGS. 11-14 the cross-sectional area defined between the piston 8 and the outlet orifice 7 varies according to the position of the piston 8 relative to the outlet orifice 7, and according to the differential pressure across the valve. Furthermore, because of the stepwise cylindrical shape of the piston 8, the cross-sectional flow area defined between the piston 8 and the outlet orifice 7 is substantially constant within two distinct differential pressure regions, allowing the fluid flow through the valve to be controlled in an accurate manner.

The first valve part 5 of FIGS. 11-14 may advantageously be movable inside a valve housing in the manner described above with reference to FIGS. 1-3.

Figure 15:
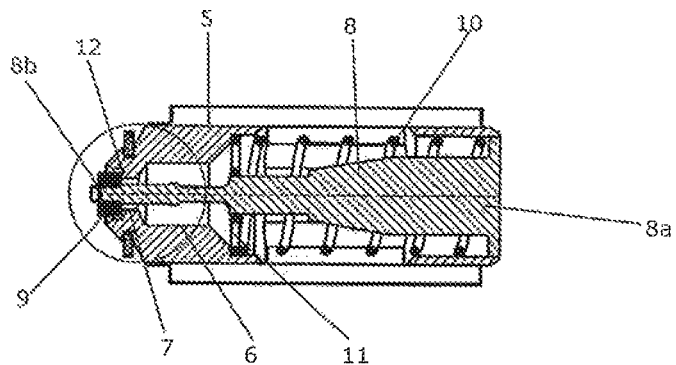
FIGS. 15-19 are cross-sectional views of a first valve part for an expansion valve according to a fifth embodiment of the invention.

FIGS. 15-19 are cross-sectional views of a first valve part 5 for an expansion valve according to a fifth embodiment of the invention. FIG. 15 shows the entire first valve part 5. The first valve part 5 comprises an inlet orifice 6 and an outlet orifice 7, defining a forward fluid flow passage through the first valve part 5. The first valve part 5 of FIGS. 15-19 is similar to the first valve part 5 of FIGS. 4-6, to the first valve part 5 of FIGS. 7-10, and to the first valve part 5 of FIGS. 11-14, and it will not be described in detail here.

In the embodiment of FIGS. 15-19 the part of the piston 8 which extends through the outlet orifice 7 has different cylindrical shapes stepwise along a longitudinal extension of the piston 8. The cross-sectional area of the piston 8 in a first region is smaller than the cross-sectional area of the piston 8 in a second region, the first region being closer to the outlet end of the piston 8 than the second region. In a third region, further away from the outlet end 8b of the piston 8, the cross-sectional area of the piston is smaller than the cross-sectional area of the piston 8 in the first region. In each of the regions the cross-sectional area of the piston 8 is substantially constant.

When the part of the piston 8 corresponding to the third region is in the outlet orifice 7, a cross-sectional flow area defined between the piston 8 and the outlet orifice 7 is larger than a cross-sectional flow area defined between the piston 8 and the outlet orifice 7 when the part of the piston 8 corresponding to the first region is in the outlet orifice 7, and when the part of the piston 8 corresponding to the first region is in the outlet orifice 7, a cross-sectional flow area defined between the piston 8 and the outlet orifice 7 is larger than a cross-sectional flow area defined between the piston 8 and the outlet orifice 7 when the part of the piston 8 corresponding to the second region is in the outlet orifice 7.

Figure 16:
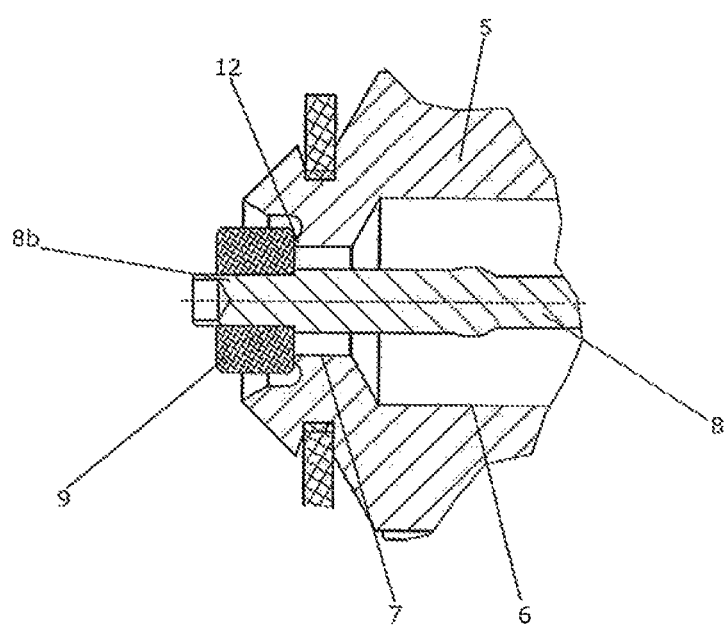

FIGS. 16-19 show a detail of the first valve part 5 of FIG. 15. In FIG. 16 the stop element 9 abuts the valve seat 12. A forward fluid flow through the first valve part 5 is prevented, i.e. the expansion valve is in a closed position. In the situation illustrated in FIG. 16 the differential pressure across the valve is below the predefined threshold value.

Figure 17:
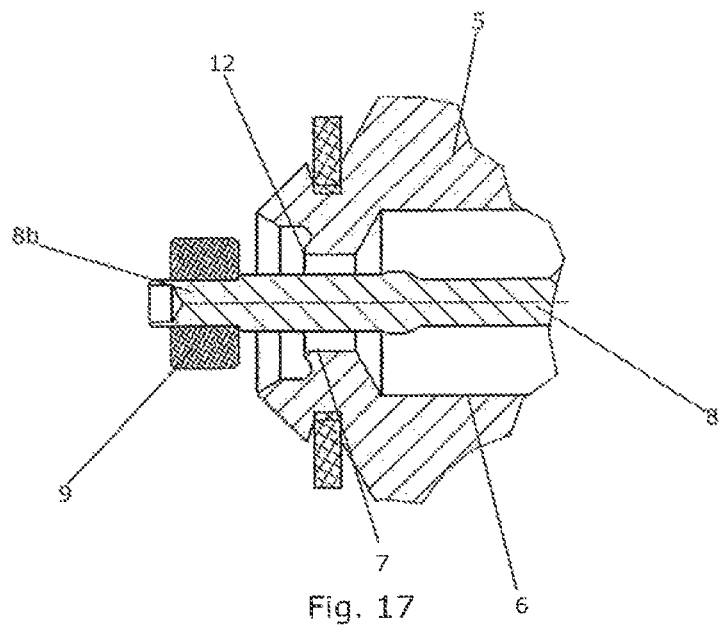

In FIG. 17 the stop element 9 has been moved out of abutment with the valve seat 12. A forward fluid flow through the first valve part 5, via the forward fluid passage defined by the inlet orifice 6 and the outlet orifice 7, is allowed, and the valve is in an open position. In the situation illustrated in FIG. 17 the differential pressure across the valve is above the predefined threshold value. However, the differential pressure is relatively close to the predefined threshold value, and the piston 8 has only been moved a small distance away from the position in which the stop element 9 abuts the valve seat 12. The part of the piston 8 which is in the outlet orifice 7 corresponds to the first region, and a relatively large cross-sectional flow area is defined between the piston 8 and the outlet orifice 7.

Figure 18:
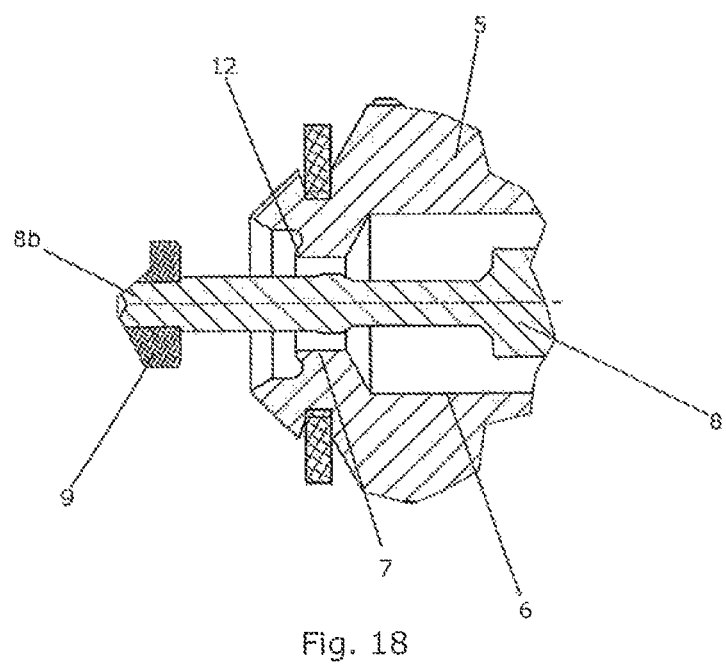

In FIG. 18 the piston 8 has been moved further in the direction which moves the stop element 9 away from the valve seat 12. The differential pressure across the valve in the situation illustrated in FIG. 18 is higher than the differential pressure across the valve in the situation illustrated in FIG. 17. Therefore, the part of the piston 8 which is in the outlet orifice 7 corresponds to the second region, and the cross-sectional area defined between the piston 8 and the outlet orifice 7 is smaller than is the case in the situation illustrated in FIG. 17.

Figure 19:
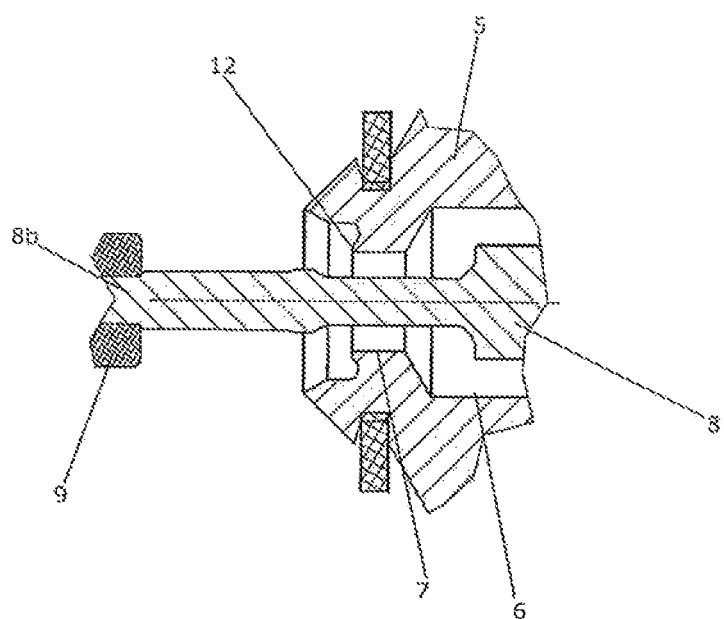

In FIG. 19 the piston 8 has been moved even further in the direction which moves the stop element 9 away from the valve seat 12. The situation illustrated in FIG. 19 corresponds to a very high differential pressure across the valve. Therefore, the part of the piston 8 which is in the outlet orifice 7 corresponds to the third region, and the cross-sectional area defined between the piston 8 and the outlet orifice 7 is larger than is the case in the situations illustrated in FIGS. 17 and 18.

In the case that the expansion valve supplies refrigerant to an evaporator of a micro channel type, there is a risk that the valve opens too slowly following a start-up of the compressor, and the refrigerant supply to the evaporator is insufficient. This causes a significant increase in the differential pressure across the expansion valve, and introduces undesired transients in the system. The increase in differential pressure across the expansion valve causes the piston 8 to be moved to a position where the part of the piston 8 which is in the outlet orifice 7 corresponds to the third region, i.e. the situation illustrated in FIG. 19. A very large cross-sectional flow area is defined between the piston 8 and the outlet orifice 7, resulting in a large fluid flow through the expansion valve. Accordingly, a sufficient refrigerant supply to the evaporator is ensured, thereby eliminating the undesired transients and decreasing the differential pressure across the expansion valve.

In the first valve part 5 of FIGS. 15-19 the cross-sectional area defined between the piston 8 and the outlet orifice 7 varies according to the position of the piston 8 relative to the outlet orifice 7, and according to the differential pressure across the valve. Furthermore, because of the stepwise cylindrical shape of the piston 8, the cross-sectional flow area defined between the piston 8 and the outlet orifice 7 is substantially constant within three distinct differential pressure regions, allowing the fluid flow through the valve to be controlled in an accurate manner.

The first valve part 5 of FIGS. 15-19 may advantageously be movable inside a valve housing in the manner described above with reference to FIGS. 1-3.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. An expansion valve for a vapour compression system, the valve comprising:
   a first valve part having an outlet orifice in relation to an intended fluid flow direction through the first valve part, said outlet orifice providing a forward fluid passage through the first valve part, and a valve seat at an outlet of the outlet orifice,
   a piston having an inlet end and an outlet end in relation to the intended fluid flow direction through the first valve part, wherein the piston is movable inside the outlet orifice in response to a differential pressure across the expansion valve, controlling a fluid flow through the valve, via the forward fluid passage through the first valve part, and
   the piston comprising a stop element at the outlet end of the piston and mechanical forcing means to force the piston towards a position in which the stop element is brought into abutment with the valve seat of the first valve part, wherein a differential pressure below a predefined threshold value causes the stop element of the piston to abut the valve seat of the first valve part, preventing fluid flow through the first valve part, via the forward fluid passage;

wherein a cross-sectional flow area of the outlet orifice between a circumference at an inner surface of the outlet orifice and a circumference at an outer surface of the piston varies as a function of the position of the piston relative to the outlet orifice;

wherein the cross-sectional flow area continuously decreases when the piston moves in a direction where the stop element moves away from the valve seat;

wherein said expansion valve further comprises a valve housing, wherein the first valve part is movable inside the valve housing, wherein a first position of the first valve part inside the valve housing allows a forward fluid flow through the expansion valve and prevents a reverse fluid flow through the expansion valve, and wherein a second position of the first valve part inside the valve housing allows a reverse fluid flow through the expansion valve, where the stop element is abutting the valve seat and is preventing forward fluid flow through the first valve part.

2. The expansion valve according to claim 1, wherein the piston has a conical outer surface.

3. The expansion valve according to claim 2, wherein an inlet orifice provides a rearward fluid passage through the first valve part.

4. The expansion valve according to claim 1, wherein an inlet orifice provides a rearward fluid passage through the first valve part.

5. The expansion valve according to claim 1, wherein the mechanical forcing means comprises a compressible spring, said compressible spring being positioned between the inlet end of the piston and a spring contact surface of the first valve part.

6. The expansion valve according to claim 1, wherein the stop element is an elastomeric element fixed to the outlet end of the piston, and is forming an enlarged head of the piston, said elastomeric element having a cross-sectional area being larger than the cross-sectional area of the valve seat, and said elastomeric element having an outer circumference being larger than an inner circumference of the valve seat.

7. The expansion valve according to claim 1, wherein the circumference at the outer surface of the piston is circumferentially continuous.

* * * * *